United States Patent [19]

Eger et al.

[11] Patent Number: 4,842,193
[45] Date of Patent: Jun. 27, 1989

[54] FLOOR GROUP FOR A VEHICLE, ESPECIALLY FOR A MOTOR VEHICLE

[75] Inventors: Georg Eger, Hochdorf-Vaihingen; Walter Pross, Sindelfingen, both of Fed. Rep. of Germany

[73] Assignee: Dr. Ing. h.c.F. Porsche Aktiengesellschaft, Stuttgart, Fed. Rep. of Germany

[21] Appl. No.: 148,022

[22] Filed: Jan. 25, 1988

[30] Foreign Application Priority Data

Jan. 23, 1987 [DE] Fed. Rep. of Germany ....... 3701911

[51] Int. Cl.⁴ .............................................. B60H 1/02
[52] U.S. Cl. ........................... 237/12.3 A; 237/12.3 C
[58] Field of Search ................... 237/12.3 A, 12.3 B, 237/12.3 R, 12.3 C, 43; 180/54.1

[56] References Cited

U.S. PATENT DOCUMENTS

| | | | |
|---|---|---|---|
| 2,191,526 | 2/1940 | Flogaus | 237/12.3 B |
| 2,347,141 | 4/1944 | Werdhoff | 237/12.3 B X |
| 2,696,774 | 12/1954 | Bayley | 237/12.3 B X |

FOREIGN PATENT DOCUMENTS

| | | |
|---|---|---|
| 1857373 | 8/1962 | Fed. Rep. of Germany . |
| 1275371 | 4/1963 | Fed. Rep. of Germany . |
| 2329985 | 1/1975 | Fed. Rep. of Germany . |
| 1079639 | 12/1954 | France . |
| 58-211976 | 12/1983 | Japan . |

*Primary Examiner*—Henry A. Bennet
*Attorney, Agent, or Firm*—Barnes & Thornburg

[57] ABSTRACT

A floor group for a vehicle, especially for a motor vehicle includes a tunnel arranged in the floor center and extending in the vehicle longitudinal direction, whereby power plant parts and at least one line for the heating and/or ventilation of the motor vehicle are provided inside or adjacent the tunnel and the tunnel is closed off in the direction toward the road surface by a cover element. In order to so construct a line for the heating and/or ventilation which is arranged adjacent a tunnel that together with a simple construction it can be assembled and disassembled with low expenditure, the line is construcuted in one piece with the cover element at least over a partial area of its longitudinal extent.

20 Claims, 2 Drawing Sheets

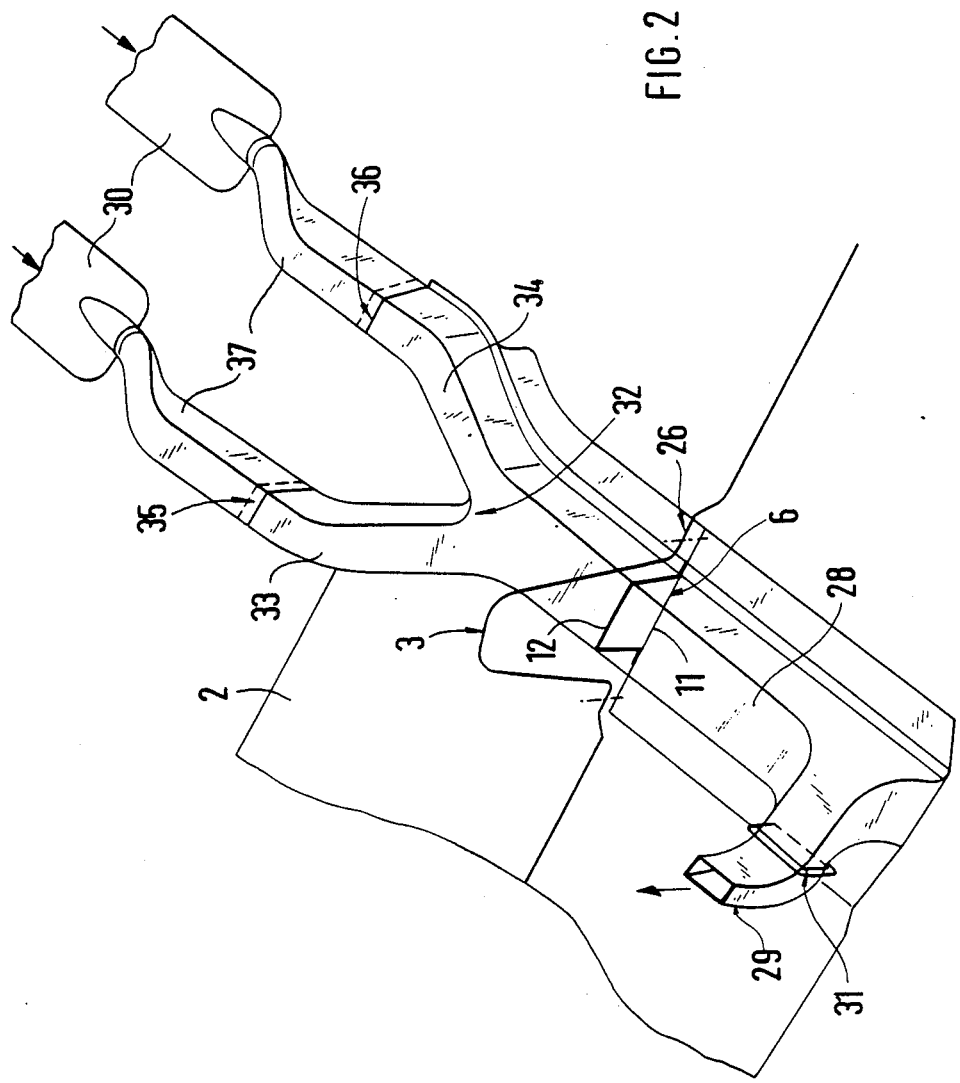

FLOOR GROUP FOR A VEHICLE, ESPECIALLY FOR A MOTOR VEHICLE

BACKGROUND AND SUMMARY OF THE INVENTION

The present invention relates to a floor group for a vehicle, especially for a motor vehicle, with a tunnel arranged in the floor center and extending in the vehicle longitudinal direction, whereby power plant parts and at least one line or conduit for the heating and/or ventilation system of the motor vehicle are provided inside or adjacent the tunnel and the tunnel is closed off in the direction toward the road surface by a cover element.

In a known floor group of the aforementioned type (DE-AS No. 23 29 985), only the power plant parts are arranged inside the tunnel whereas the lines for the venting and/or heating system are attached freely exposed underneath the cover element. This arrangement entails the disadvantage that the lines are not protected against dirt and mechanical loads and therefore can be easily damaged. The ground clearance of the vehicle is limited by the lines protruding toward the road surface. Therebeyond, the aerodynamic conditions in the subfloor area become worse which has as a consequence an increase of the air resistance coefficient. Finally, during a repair of the power plant parts, the lines for the heating and/or ventilation system must be disassembled before the cover element can be removed which represents a considerable expenditure.

A floor group for a motor vehicle with a tunnel extending in the vehicle longitudinal direction is disclosed in the DE-PS No. 12 75 371, whereby the tunnel is formed by a channel-shaped identification of the floor plate open in the upward direction and by a stamping mounted on the top side of the floor plate. The floor plate and the stamping are connected with each other along flanges directed in the same direction by spot-welding. A pipe-shaped line formed by a separate structural part is arranged inside the tunnel.

This arrangement entails the disadvantage that additional fastening elements are required for the mounting of the line inside of the tunnel. In case of repir, the accessibility to the line is strongly limited because the stamping is non-detachably connected with the floor plate.

It is the object of the present invention to so construct a line for the heating and/or ventilation which is arranged adjacent a tunnel that combined with simple construction it can be assembled and disassembled with slight expenditure.

The underlying problems are solved according to the present invention in that the line for the heating and/or ventilation is constructed in one piece with the cover element over at least a partial area of its longitudinal extent.

The principal advantages achieved with the present invention reside in that owing to the one-piece construction of the line with the cover element, a tunnel construction is created which has a simple construction and can be manufactured favorably from a cost point of view. Furthermore, the line for the heating and/or ventilation can be assembled and disassembled rapidly and is readily accessible in the case of repair. The strength of the body (bending, torsion and crash) is therebeyond considerably improved by the construction of the line as box-shaped bearer. Additional fastening elements for the line are at least reduced.

BRIEF DESCRIPTION OF THE DRAWINGS

These and other objects, features and advantages of the present invention will become more apparent from the following description when taken in connection with the accompanying drawing which shows, for purposes of illustration only, one embodiment in accordance with the present invention, and wherein:

FIG. 2 is a perspective view from in front on the floor group with the tunnel of FIG. 1.

DETAILED DESCRIPTION OF THE DRAWINGS

Figure 1:
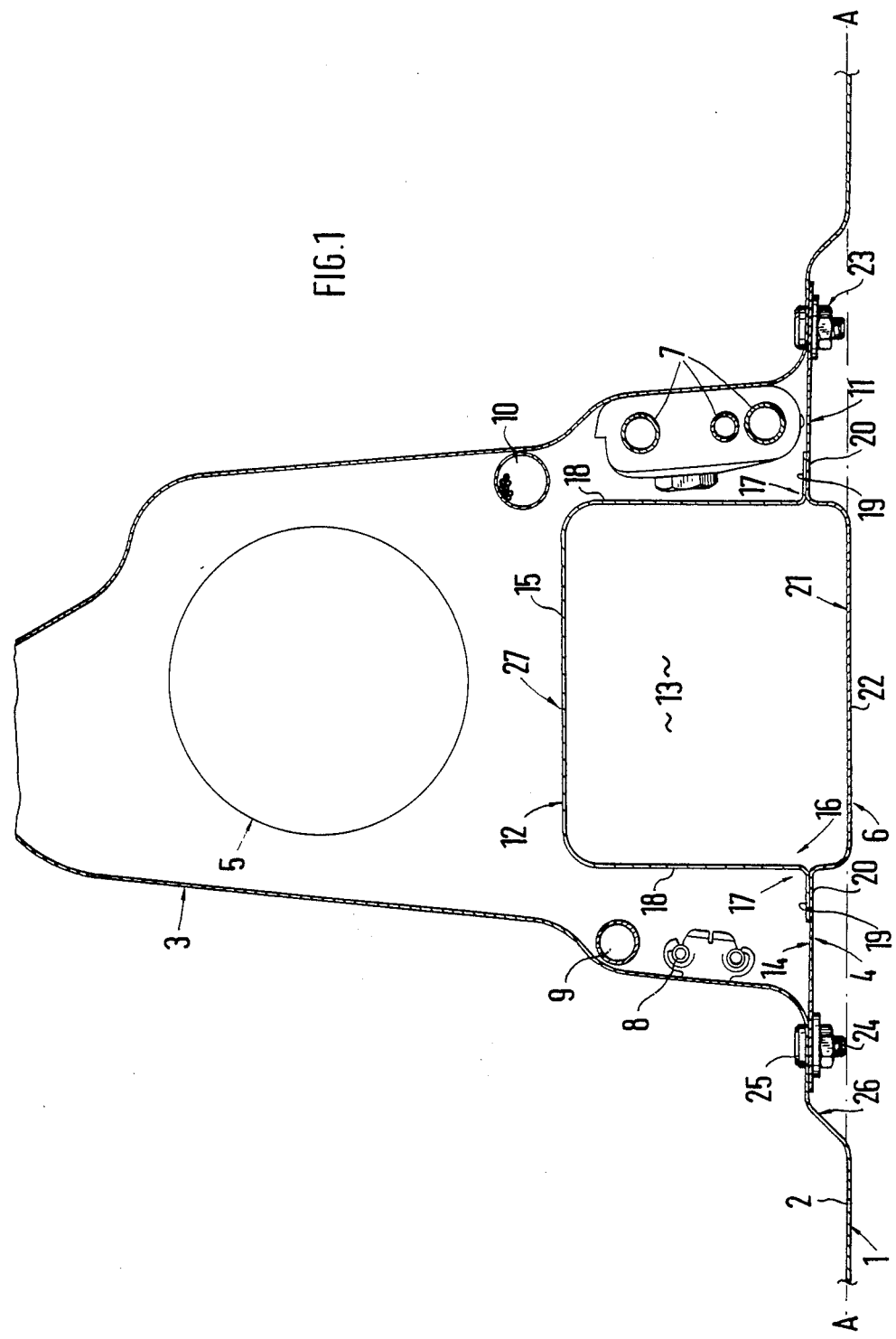
FIG. 1 is a vertical cross-sectional view in the vehicle transverse direction through a floor group of a vehicle in accordance with the present invention.

Referring now to the drawing wherein like reference numerals are used throughout the two views to designate like parts, a floor group generally designated by reference numeral 1 for a motor vehicle includes in the illustrated area a sheet metal floor panel 2 with a tunnel 3 arranged in the floor center and extending in the vehicle longitudinal direction which is provided with a downwardly directed tunnel opening 4. The tunnel 3 constructed in one piece with the sheet metal floor panel 2 serves for the accommodation of power plant parts (for example, transaxle tube) as well as of lines 6 for the heating and/or ventilation of the motor vehicle. Additionally, fuel lines 7, brake lines 8, vacuum lines 9 and electrical lines 10 are accommodated according to FIG. 1 inside of the tunnel. The tunnel opening 4 is closed off in the direction toward the road surface by a plate-shaped cover element 11.

The line 6 for the heating and/or ventilation of the motor vehicle is constructed in one piece with the cover element 11 at least over a partial area of its longitudinal extent. Corresponding to FIG. 1, the line 6 is formed by the cover element 11 and a closure part 12 connected with the same, whereby the cover element 11 and the closure part 12 are attached to one another under formation of a hollow space 13. The closure part 12 is preferably mounted on the side 14 of the cover element 11 opposite the road surface, i.e., it extends covered off inside of the tunnel 3. The hollow space 13 may be constructed of rectangular shape, square shape, circular shape or the like.

According to FIG. 1, the closure part 12 is represented by an approximately U-shaped hat profile 15 which is directed with its open side 16 toward the cover element 11. Horizontally bent webs 19 adjoin the free ends 17 of vertically directed legs 18 of the hat profile 15 which are connected with the flanges 20 of the cover element 11 that extend parallel thereto, by bonding, welding, brazing or the like. The cover element 11 includes a channel-shaped indentation 21 underneath the closure part 12 whose lower boundary wall 22 extends in a common plane A—A with the floor panel 2.

The sheet metal closure panel 12 forms, together with the cover element 11, a preassembled structural unit which adjoining the tunnel 3 is detachably connected with the sheet metal floor panel 2 of the floor group 1. For that purpose, vertically directed welded-on bolts generally designated by reference numeral 23 are locally provided at the floor panel 2 whose threaded sections 24 are directed toward the road surface whereas the heat areas 25 of the welded-on bolts 23 are supported at the side 14 of the floor panel 2 opposite the road surface. The welded-on bolts 23 are arranged within groove-like edge reinforcements 26 of the tunnel 3 and have such a height that the free ends of the threaded sections 24 do not project downwardly beyond the horizontal plane A—A. For fastening the cover element 11, nuts are screwed on the threaded sections 24 from the underside whereby washers are provided between the cover element 11 and the nuts.

The line or conduit 6 for the heating and/or ventilation is constructed as box girder 27 which extends underneath the power plant parts 5 over a considerable part of the width of the tunnel 3. The two ends of the box bearer 27 extending in the vehicle longitudinal direction are constructed open. The rigidity and torsion-resistance of the body is increased by the box bearer 27, the cover element 11 and the tunnel 3.

According to FIG. 2, the line 6 formed by the cover element 11 and the closure part 12 represents a partial area 28 of a warm air channel 29 of a heating system (not shown) for a motor vehicle with air-cooled rear engine whereby the warm air channel 29 extends from heat-exchangers 30 which are arranged in the rear end, forwardly up to a distributor apparatus (not shown) of the heating system accommodated in the passenger space. The partial area 28 of the warm air channel 29 which is constructed in one piece with the cover element 11 includes a drawn-up forward end area 31 and in its rear area 32 splits fork-shaped into two partial channels 33 and 34 which terminate at 35 and 36. Connecting pieces 37 are each connected to the end areas 35 and 36 which lead to the heat-exchangers 30 disposed therebehind whereby the connecting pieces 37 are mounted over the end areas 35 and 36. The connecting pieces 37 are preferably formed by hoses of plastic material or aluminum. The flow direction of the warm air stream extends in the driving direction of the motor vehicle.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A floor group for a vehicle, especially a motor vehicle, comprising tunnel means arranged in the floor center and extending in the vehicle longitudinal direction, power plant parts and at least one line means for heating and/or ventilating the motor vehicle being provided inside or adjacent the tunnel means, the tunnel means being closed off in the direction toward the road surface by a cover element, and the line means being constructed over at least a partial area of its longitudinal extent in one piece with the cover element.

2. A floor group according to claim 1, wherein the line means is formed by the cover element and a closure part, and the cover element and the closure part being attached to one another under formation of a hollow space.

3. A floor group according to claim 1, wherein the closure part is mounted on the side of the cover element opposite the road surface.

4. A floor group according to claim 1, wherein the closure part is represented by an approximately U-shaped hat profile which is directed with its open side toward the cover element.

5. A floor group according to claim 1, wherein the cover element forms together with the closure part a preassembled structural unit which is detachably secured at the floor group.

6. A floor group according to claim 1, wherein the profiled closure part is connected with the cover element by welding, brazing, bonding or the like.

7. A floor group according to claim 1, wherein the line means has the shape of a box bearer whose ends are constructed open.

8. A floor group for a vehicle which is equipped with an air-cooled rear engine according to claim 1, wherein the line means constructed in one piece with the cover element represents a partial area of a warm air channel of a heating system, the warm air channel being operatively connected at its one end with heat-exchanger means and being operatively connected at its other end at distributor means of the heating system.

9. A floor group according to claim 8, wherein the warm air channel is constructed fork-shaped in an area facing the heat-exchanger means, each of the two partial channels being operatively connected with a respective heat-exchanger means by way of a connecting element.

10. A floor group according to claim 2, wherein the closure part is mounted on the side of the cover element opposite the road surface.

11. A floor group according to claim 10, wherein the closure part is represented by an approximately U-shaped hat profile which is directed with its open side toward the cover element.

12. A floor group according to claim 11, wherein the cover element forms together with the closure part a preassembled structural unit which is detachably secured at the floor group.

13. A floor group according to claim 12, wherein the profiled closure part is connected with the cover element by welding, brazing, bonding or the like.

14. A floor group according to claim 13, wherein the line means has the shape of a box bearer whose ends are constructed open.

15. A floor group for a vehicle which is equipped with an air-cooled rear engine according to claim 14, wherein the line means constructed in one piece with the cover element represents a partial area of a warm air channel of a heating system, the warm air channel being operatively connected at its one end with heat-exchanger means and being operatively connected at its other end at distributor means of the heating system.

16. A floor group according to claim 15, wherein the warm air channel is constructed fork-shaped in an area facing the heat-exchanger means, each of the two partial channels being operatively connected with a respective heat-exchanger means by way of a connecting element.

17. A floor group according to claim 8, wherein the line means is formed by the cover element and a closure part, and the cover element and the closure part being attached to one another under formation of a hollow space.

18. A floor group according to claim 17, wherein the closure part is mounted on the side of the cover element opposite the road surface.

19. A floor group according to claim 18, wherein the closure part is represented by an approximately U-shaped hat profile which is directed with its open side toward the cover element.

20. A floor group according to claim 19, wherein the line means has the shape of a box bearer whose ends are constructed open.

* * * * *